Patented Dec. 25, 1951

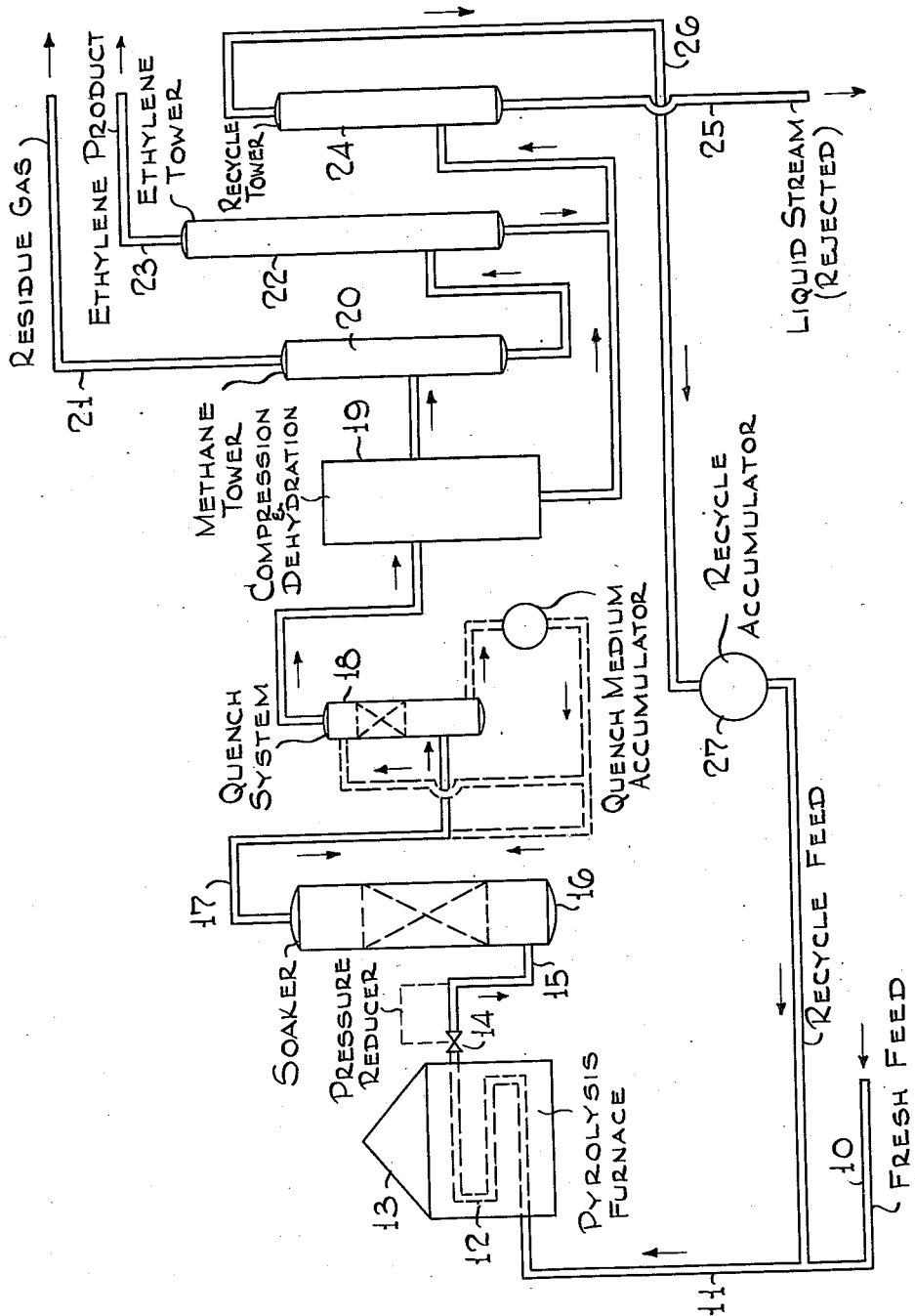

2,580,002

UNITED STATES PATENT OFFICE 2,580,002

PROCESS FOR THE PRODUCTION OF ETHYLENE

E. Wendell Carrier, Cranford, N. J., assignor to Standard Oil Development Company, a corporation of Delaware Application December 24, 1949, Serial No. 134,987

7 Claims. (Cl. 260—683)

1

The present invention pertains to the production of olefins and particularly to the production of ethylene by pyrolysis of propane or ethane or gaseous mixtures containing substantial amounts of propane or ethane. Propylene may also be an important constituent of such gaseous mixtures.

Pyrolysis of gaseous hydrocarbons has been the subject of much study particularly because of the fact that it provides a way of converting large quantities of available natural gas as well as gases produced in the thermal or catalytic conversion of petroleum into valuable liquid products such as motor fuels, heating oil and the like or into other hydrocarbon materials such as ethylene which is useful in the manufacture of a large variety of chemical products. For example, the ethylene thus formed may be polymerized to form valuable polymers or it may be converted to ethylene oxide which is valuable as an intermediate for the production of surface active agents or the like.

It is the object of this invention to provide a process for cracking ethane-propane mixtures or gaseous mixtures containing substantial quantities of ethane or propane which will give increased concentrations of ethylene in the cracked gases.

It is also the object of this invention to provide a method for cracking ethane and propane and gaseous mixtures containing substantial quantities of either of these hydrocarbons which will increase the ratio of ethylene to ethane in the cracked gases.

These and other objects will appear more clearly from the detailed specification and claims which follow.

It has now been found that the concentration of ethylene in the cracked gas as well as the ratio of ethylene to ethane in the $C_2$ fraction of the cracked gas can be increased by thermally cracking ethane or propane or gaseous mixtures containing substantial quantities of them under pressures of 2 atmospheres or more at the cracking coil outlet and then reducing the pressure to about 1 atmosphere and further treating the reaction product in a soaking zone containing a hydrogenation catalyst.

Reference is made to the accompanying drawing wherein a schematic flow diagram of the process of the present invention is shown.

Referring to the drawing, 10 is a fresh feed supply line connected through supply line 11 to cracking coil 12 arranged in furnace 13. A pressure reducing valve 14 is arranged in the product line 15 at the furnace outlet, the line 15 discharging into soaking drum 16 which is charged with a suitable hydrogenation catalyst. The reaction products withdrawn from the soaking drum are discharged through line 17, quench tower 18 into compression and dehydration system 19. A suitable system for accumulating, cooling and recycling the quenching medium is desirably provided. The compressed and dehydrated reaction product mixture is then passed to a fractionation system, residual gas comprising hydrogen and methane being taken overhead from methane tower 20 through line 21. The bottoms from the methane tower 20 are then passed to a second tower 22 wherein ethylene product is separated overhead through line 23 while the bottoms from ethylene tower 22 are passed to recycle tower 24 wherein a liquid stream is separated from gaseous materials such as ethane, propylene and propane which is suitable for recycling in the process. The liquid stream is withdrawn through line 25 while the gaseous products are withdrawn through line 26 and passed to a recycle accumulator 27 from which the recycle gas may be withdrawn as desired and combined with fresh feed in the supply line 11 to the cracking coil.

Olefins, particularly, ethylene, can be prepared in accordance with the present invention by cracking light hydrocarbon gases particularly ethane and propane or mixtures containing major proportions of ethane or propane. A gaseous mixture containing approximately 20% ethane, 20% propylene and 60% propane has been found to be a desirable feed stock.

The light hydrocarbon gases are cracked at temperatures of about 650° C. to about 850° C., preferably between 750° C. and 800° C., and at pressures ranging between 2 and 10 atmospheres, preferably at 4 or 5 atmospheres' pressure. All of the conditions just given are those prevailing at the cracking coil outlet. The hydrocarbon gases are subjected to cracking under these coil outlet conditions for very short contact times, usually less than two seconds after the time the temperature attains about 620° C. in the cracking coil until the gases leave the coil at 750°–800° C. The cracking rate of light hydrocarbon gases is negligible below 600° to 620° C. so that contact times are usually measured above these temperatures. Commercial pyrolysis coils for light hydrocarbons are generally designed for a continuously rising temperature gradient up to the outlet and no constant temperature soaking tubes are employed. Changes in the degree of cracking or conversion are effected simply by raising or lowering the coil outlet temperature. It is recognized generally in the chemical industry that for practical and economic reasons it is not desirable to crack light hydrocarbons completely in a single pass through the coil. After recovery of the ethylene product a selected fraction of the pyrolysis coil effluent is usually recycled, which consists predominantly of ethane, propylene and propane which may have been present as such originally in the fresh feed or some of which may have been formed from other hydrocarbons during previous pyrolysis cycles. The fresh feed is generally combined with the recycled gases and charged to the cracking coil furnace where it is heated to the proper temperature at which the desired or maximum obtainable conversion takes place so that the range of coil exit temperatures and pressures previously mentioned are observed.

In practicing the present invention the cracked gases are passed directly from the pyrolysis zone without removal of heat into a soaking drum (or into soaking tubes) containing a mild hydrogenation catalyst, which may be an oxide of a metal of the 6th group of the periodic table such as alumina-molybdenum oxide, molybdenum oxides supported on silica, or chromium oxides on similar supports. It is important that the pressures greater than 2 atmospheres which are maintained at the outlet of the pyrolysis coil be reduced in the soaking zone to about 1 atmosphere absolute. The temperature conditions for soaking include those already specified for the cracking zone, although a slight temperature rise may be experienced due to the reactions occurring wherein ethane and some propylene are destructively hydrogenated to give predominantly methane and some ethylene as further described hereafter. Time of contact in the soaking zone should be between one-half minute and ten minutes, with about one minute as the preferred length of contact with the hydrogenation catalyst.

The cracked gases are withdrawn from the soaking equipment, immediately quenched to reduce the temperature to 120°–150° C., and the ethylene separated and concentrated as by low temperature high pressure fractionation. As an alternate method of recovering the ethylene an adsorption process such as with activated charcoal or other adsorbents may be used. The low temperature fractionation method for purifying the ethylene has been selected for illustration herein because of its flexibility, but will not be discussed in detail since its practical process and engineering design aspects have been published and are well known. Ethylene recovery methods are mentioned here solely for the purpose of defining the recycle stream to the pyrolysis furnace.

The following example is illustrative of the present invention. Combined feed consisting of fresh and recycled gases from the recovery of ethylene product is compressed at about 25° C. to sufficient pressure to allow flow through the heating-up convection and radiation tubes and through the radiation cracking tubes of the pyrolysis furnace at the very high velocity necessary to give one second contact time at temperatures between 620° C. and 770° C. Furnace outlet cracked gas pressure is about 29 p. s. i. g. when the inlet gas pressure is about 110 p. s. i. g. The cracked gas pressure is reduced to 1 p. s. i. g. by means of a pressure control valve while passing directly to a soaking drum containing a bed of supported hydrogenation catalyst. The cracked gas remains in the soaker close to one minute at 772° C. and 1 p. s. i. g. pressure, and is then transferred to a quench system where the temperature is dropped quickly to about 125° C. by direct heat exchange with a high-boiling oil. The gaseous conversion products are then compressed to 600 p. s. i. g., further cooled indirectly to 30° C., dehydrated and separated by low temperature fractionation into (a) a residue stream consisting principally of hydrogen and methane, (b) ethylene product stream and (c) a hydrocarbon fraction rich in ethane, propylene and propane as analyzed in detail below which is recycled to the pyrolysis furnace. A liquid fraction is also withdrawn containing the higher molecular weight hydrocarbons formed during pyrolysis and hydrogenation.

The composition and relative quantities of the fresh and recycle feed streams, the cracked gas immediately following the pyrolysis coil and the cracked gas after soaking over alumina-molybdenum oxide catalyst are shown in the following table:

*Table*

| Mols | Fresh Feed | Recycle | Furnace Outlet | Soaker Gas |
|---|---|---|---|---|
| $H_2$ | | | 25.8 | 4.6 |
| $CH_4$ | 1.8 | | 58.8 | 97.7 |
| $C_2H_4$ | 2.7 | 3.3 | 61.2 | 64.8 |
| $C_2H_6$ | 31.3 | 39.4 | 59.8 | 42.1 |
| $C_3H_6$ | 3.5 | 18.0 | 24.0 | 20.5 |
| $C_3H_8$ | 58.7 | 18.1 | 22.2 | 22.1 |
| $C_4$ | 1.7 | 3.2 | 4.2 | 4.2 |
| $C_4+$ | 0.3 | | 4.0 | 4.0 |
| | 100.0 | 82.0 | 260.0 | 260.0 |

By comparison of the figures contained in the last two columns of the above table, it can be seen that the thermally cracked gas is destructively hydrogenated by soaking in the presence of the hydrogenation catalyst so that hydrogen and a substantial proportion of the ethane present in the cracked gas largely disappear, while methane is simultaneously formed. This net change in the composition of the gas may be represented by the equation $C_2H_6+H_2 \rightarrow 2CH_4$. Furthermore, some propylene also disappears, which disappearance is accompanied by the formation of methane and ethylene, this change corresponding to the equation $$C_3H_6+H_2 \rightarrow C_2H_4+CH_4$$

The chief advantage of the process of the present invention is that the concentration of ethylene in the $C_2$ fraction of the cracked gas is increased, generally being about 20% greater after soaking over a hydrogenation catalyst, so that a corresponding similar percent reduction in reflux and heat required to separate the $C_2$ components is realized during rectification for example at low temperature. Another economic advantage of the present process is that the volume of the ethane- and $C_3$-rich recycle gas per mol of ethylene product is appreciably reduced with the result that the capacity of the pyrolysis furnace for fresh hydrocarbon feed, hence for ethylene production, is improved.

The foregoing specification contains a limited number of embodiments of the present invention. It will be understood, however, that numerous variations are possible without departing from the scope of the following claims.

What is claimed is:
1. A process for the production of ethylene which comprises thermally cracking a gaseous hydrocarbon mixture containing ethane, propylene and a major portion of propane under a pressure of at least two atmospheres, reducing the pressure of the resulting hydrogen-containing thermally cracked products to about atmospheric pressure and discharging the hot thermally cracked gases into a soaking zone charged with a hydrogenation catalyst containing an oxide of a 6th group metal, maintaining the thermally cracked gases in the soaking zone until the concentration of ethylene in the $C_2$ fraction of the cracked gas is substantially increased by a reaction mechanism involving a disappearance of ethane and hydrogen and a corresponding formation of methane, removing the cracked gases from the soaking zone and separating the ethylene therefrom.

2. A process for the production of ethylene which comprises thermally cracking a mixture of about 20% ethane, 20% propylene and 60% propane under a pressure of from 2 to 10 atmospheres and at cracking coil outlet temperatures from 750 to 800° C. with a contact time of less than about 2 seconds, reducing the pressure of the resulting hydrogen containing cracked product to about 1 atmosphere absolute, discharging the thermally cracked gases into a soaking zone charged with a hydrogenation catalyst containing an oxide of a 6th group metal, maintaining the hot, thermally cracked gases in the soaking zone at temperatures of about 650 to 850° C. for about 0.5 to 10 minutes whereby a decrease in the ethane and hydrogen content of the cracked gases is obtained together with a corresponding increase in methane content and the concentration of ethylene in the $C_2$ fraction of the cracked gases is thus substantially increased, removing the cracked gases from the soaking zone, immediately quenching the removed gases to reduce their temperature to 120–150° C., and separating the ethylene therefrom.

3. The process as defined in claim 1 wherein the temperature in the thermal cracking zone and in the soaking zone is from 650 to 850° C.

4. The process as defined in claim 1 wherein the temperature in the thermal cracking zone and in the soaking zone is from 750 to 800° C. and the hydrogenation catalyst comprises molybdenum oxide on alumina.

5. The process as defined in claim 2 wherein the hydrogenation catalyst comprises molybdenum oxide on alumina.

6. A process for the production of ethylene which comprises thermally cracking a light hydrocarbon gas containing 2 to 3 carbon atoms per molecule at a temperature between 650° C. and 850° C. under a pressure of at least 2 atmospheres, reducing the pressure of the resulting hot hydrogen-containing cracked gas mixture to about 1 atmosphere, contacting the said hot cracked gas mixture with a hydrogenation catalyst containing an oxide of a 6th group metal in a soaking zone at the reduced pressure until a net decrease in ethane and hydrogen concentration and a corresponding increase in methane concentration is obtained and the ethylene concentration of the $C_2$ fraction of the cracked gas mixture is thus increased, removing the resulting gas mixture from the soaking zone, quenching the removed gas mixture and separating an ethylene-rich fraction therefrom.

7. A process according to claim 6, which comprises the further step of separating from the gas mixture removed from the soaking zone a fraction rich in ethane and $C_3$ hydrocarbons and recycling this fraction to the thermal cracking step.

E. WENDELL CARRIER.

REFERENCES CITED

The following references are of record in the file of this patent:

UNITED STATES PATENTS

| Number | Name | Date |
|---|---|---|
| 2,194,280 | Grosse | Mar. 19, 1940 |
| 2,418,255 | Frey | Apr. 1, 1947 |
| 2,465,016 | Frey | Mar. 22, 1949 |